though Cowdery et al.

United States Patent [19]

[11] 3,807,549

[45] Apr. 30, 1974

[54] PINCH ROLL DRIVE

[76] Inventors: James R. Cowdery, 32 Morton St., Andover, Mass. 01810; Harald O. Korstvedt, 116 Winthrop, Brookline, Mass. 02146

[22] Filed: Aug. 3, 1971

[21] Appl. No.: 168,676

[52] U.S. Cl. ............................... 198/203, 198/208
[51] Int. Cl. ............................................. B65g 23/00
[58] Field of Search ........... 198/136, 203, 208, 121, 198/123, 117, 94; 74/242.10, 242.15, 242.8

[56] References Cited
UNITED STATES PATENTS

| | | | |
|---|---|---|---|
| 2,973,084 | 2/1961 | Sinden et al. | 198/208 |
| 1,220,338 | 3/1917 | Humphrey | 198/122 |
| 2,413,339 | 12/1946 | Stadelman | 198/136 |
| 2,735,537 | 2/1956 | Keller | 198/203 |
| 2,148,370 | 2/1939 | Edgington | 74/242.1 R |

FOREIGN PATENTS OR APPLICATIONS

| 276,197 | 8/1927 | Great Britain | 198/203 |
|---|---|---|---|

Primary Examiner—Richard E. Aegerter
Attorney, Agent, or Firm—Morse, Altman, Oates & Bello

[57] ABSTRACT

A conveyor belt configuration, for use in apparatus such as breading machines, comprising a single endless conveyor belt with a relatively large diameter drive roller imparting the lineal motion to one end of the conveyor belt, a relatively small diameter idler nose roller at the opposite end of the conveyor system with a relatively intermediate diameter pinch roller driving arrangement located near said idler nose roller to provide the linear motion to the opposite end of the conveyor system. The speed of rotation of the large diameter drive roller is relatively slow being inversely proportional to the relatively large diameter thereof and accordingly the speed of rotation of the pinch roller is relatively fast being inversely proportional to the relatively intermediate diameter thereof, said speeds and said diameters being predetermined such that the lineal speed of the belt at any location throughout the orbital path of the system is constant.

1 Claim, 3 Drawing Figures

PINCH ROLL DRIVE

BACKGROUND OF THE INVENTION

Automatic breading machines and similar machines presently utilize a plurality of conveyor belt systems for moving food products, the common one having a large main drive belt operating between two large diameter driving rollers, a small delivery belt having a single small diameter driving roller with two small diameter idler rollers, and a transfer roller or roller shaft located intermediate the two belts in a manner to transfer food products from the main driving belt to the delivery belt and thence to a delivery location. A suitable system of pulleys and sprockets are utilized to drive the various drive rollers. In order to effect a readily positionable delivery point of the food products at the delivery location it is desirous to have a small diameter roller variably positioned at the delivery location. The introduction of a small diameter roller at the delivery location could not satisfy the driving and tension requirements of a single belt conveyor system, therefore it has been necessary to utilize a plurality of belts as hereinbefore described, wherein a large main drive belt with large driving rollers does the bulk of the work in moving the food products and surrounding comminuted breading through the breading machine, and a separate small delivery belt with a small maneuverable idler nose roller effects the task of delivery at the delivery point, a transfer roller shaft being utilized to transfer the food product from the main belt to the delivery belt.

SUMMARY OF THE INVENTION

According to the present invention there is provided an inexpensive conveyor system for use in breading machines and their like, said conveyor system having a single endless wire mesh conveyor belt with a large driving roller at the feeder end and a new and novel delivery end configuration including a small variably positioned idler nose roller at a delivery location, with a pinch roller assemblage providing the required driving force at the delivery end to maintain a uniform linear speed of the belt in its orbital path with a minimum of tension thereby providing long life wear of the belt.

Other advantages of this invention will become more apparent from the following description and drawings of an embodiment of this invention in which.

DESCRIPTION

Figure 1:
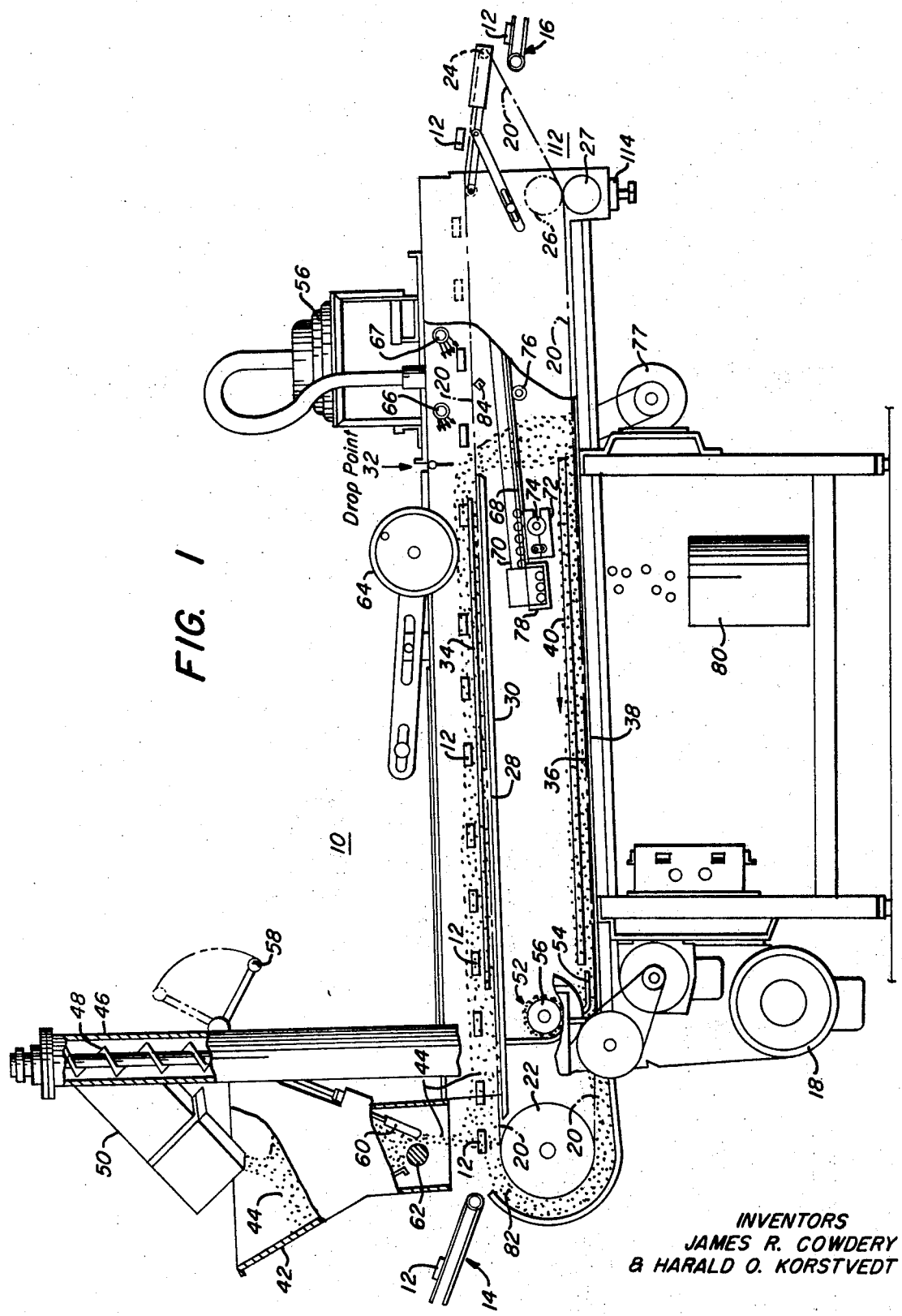
FIG. 1 shows a side elevational view of breading machine utilizing the novel pinch roller arrangement in the belt drive system.

Referring to FIG. 1 there is shown a modern breading machine 10 utilizing the novel single belt system of the present invention. In that details of the operation of the breading machine 10 of FIG. 1 are not necessary to an understanding of the present invention, a detailed description of said machine and the operation thereof is not provided herein.

FIG. 1 of the present application is nearly identical to that of FIG. 1 of the mentioned copending application with exception being made of more detail of the adjustable delivery end configuration and pinch roller being shown and described in the present application. For simplicity of description, the reference numerals of the two similar figures are the same except as applied to the adjustable delivery end and pinch roller portions comprising the present invention, which not being part of the copending application were not described in detail nor claimed therein.

Figure 2:
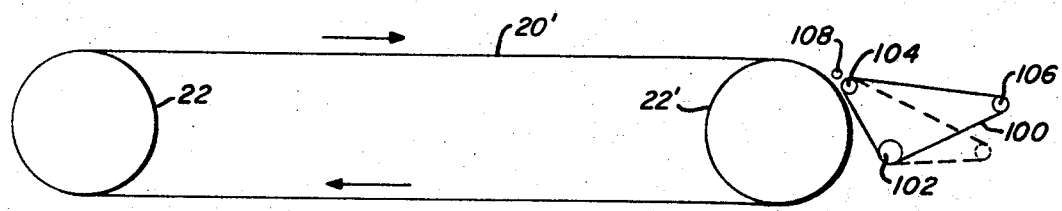
FIG. 2 shows a schematic of one of the conventional types of belt drive systems utilized in breading machines prior to the present invention.

Referring to FIG. 2, there is shown a schematic of a conventional type breading machine belt system wherein large diameter drive rollers 22 and 22' are utilized on opposite ends of the main belt 20' to provide a smooth lineal drive speed to an orbiting main belt 20'. A single belt conveyor would be more economical, would be easier to operate, however, as can be seen from the drawing, the large diameter drive rollers 22 and 22' prohibite any adjustability of the delivery end of the conveyor belt. To achieve any degree of adjustability, an auxiliary or delivery belt 100 with a separate drive roller 102 and idler rollers 104 and 106 is positioned adjacent the main belt 20' with a transfer roller 108 located intermediate the main belt 20' and the delivery belt 100 in a manner to transfer the usual food products being carried by the main belt 20' to the delivery belt 100. The drive roller 102 and the transfer roller 108 are driven by suitable pulley, gear, or chain means (not shown) by the usual main drive (not shown) of the machine. The idler roller 106 referred to as the nose roller 106 is usually adapted with adjusting means (not shown) to maintain tension on the delivery belt 100 and also adapted with a positioning means (not shown) to position the drop-off point of the delivery belt 100 as desired, one alternate position being indicated by dotted lines. It can be seen from the brief description of the conventional belt configuration of FIG. 2 that such system requires a means for carrying roller 22' and delivery belt 100 with its rollers together to allow for adjusting tension in belt 20'. Such a system just described also presents numerous opportunities for jamming of food products especially at the transfer roller 108.

Figure 3:
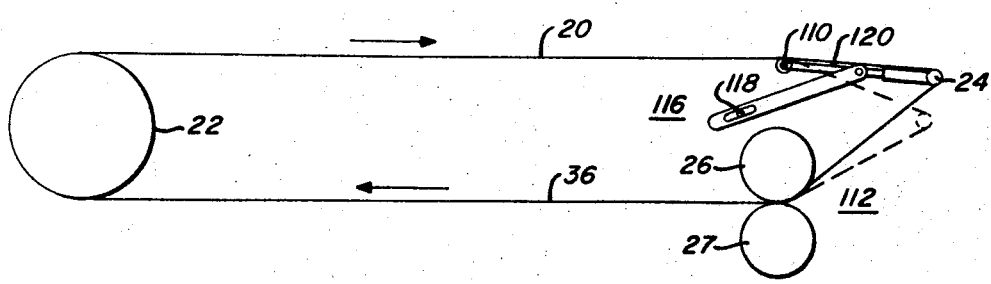
FIG. 3 is a schematic of a belt drive system, constructed according to the principles of this invention, with adjustable novel delivery end configuration including the pinch roller drive.

Referring to the new and novel belt configuration shown on the breading machine 10 of FIG. 1 and schematically in detail in FIG. 3 there is included a single main belt 20 having an orbital path around a large diameter drive roller 22, an idler roller 110, an idler nose roller 24 and through a pinch roller arrangement 112 back to the drive roller 22. The pinch roller arrangement 112 comprises a drive roller 26 and an idler roller 27 located at the delivery end of the belt configuration on the lower traverse 36 of the belt 20. The peripheral surface of the driver roller 26 of the pinch roller arrangement 112 is covered with pliable material such as rubber and radially pressed together with idler roller 27 (which may be covered or not with pliable material) by suitable adjustable pressure means shown herein in FIG. 1 as pressure regulator 114. The drive roller 26 is powered by suitable pulley or sprocket means (not shown) to be driven at the same surface speed as the drive roller 22. With the aforesaid rollers 26 and 27 of the pinch roller arrangement 112 pressed together, a smooth positive friction drive is applied to the belt 20 as it moves across their line of peripheral contact in its orbital path, with a minimum of tension requirement. The pinch roller arrangement 112, with at least the driver 26 rubber covered, insures that belt surface irregularities will not cause belt slippage as it passes through the rollers.

Because of the broad angle of contact of the belt acting on drive roller 26 the contact force, being the vector summation of the tension forces acting thereon, is relatively small and must be increased by having the idler roller 27 forced against the drive roller 26 in a manner to greatly increase the contact force in the pinch roller arrangement without increasing the tension on the belt 20.

A suitable adjusting means 116 includes adjusting links 118 and 120 are secured to the idler roller 110 and nose roller 24 and suitably connected to the machine frame to accommodate for positioning the drop-off point at the nose roller 24 as desired, an alternate position being shown dotted in FIG. 3.

It can thus be seen that by utilizing a smooth, positive friction, pinch roll arrangement, a low cost, single belt configuration may be driven at the delivery end with a reduced diameter pinch roller which greatly reduces space requirements, belt tension requirements and machine clogging possibilities encountered on conventional food processing machinery.

What is claimed is:

1. A conveyor comprising a first drive roller of relatively large diameter, an idler roller of relatively small diameter, a nose roller of relatively small diameter, a pair of pinch rollers, an endless belt under substantially constant and positive tension throughout its length extending along a path contacting and enveloping said drive roller, said idler roller, said nose roller and one of said pinch rollers, said one of said pinch rollers and the other of said pinch rollers retaining said endless belt in the nip therebetween, and a link connecting said idler roller and said nose roller, and means for adjusting the position of said link in order to adjust the location of said nose roller, one of said pinch rollers contituting a second drive roller, the sections of said endless belt at said nose roller defining an acute angle, the sections of said endless belt at said one of said pinch rollers defining an obtuse angle, at least one of said drive rollers having a resilient peripheral surface in contact with said endless belt, said second drive roller being of intermediate diameter.

* * * * *